July 8, 1941.   F. T. HARRINGTON   2,248,076
CONSTANT PRESSURE REGULATOR
Filed Nov. 5, 1937
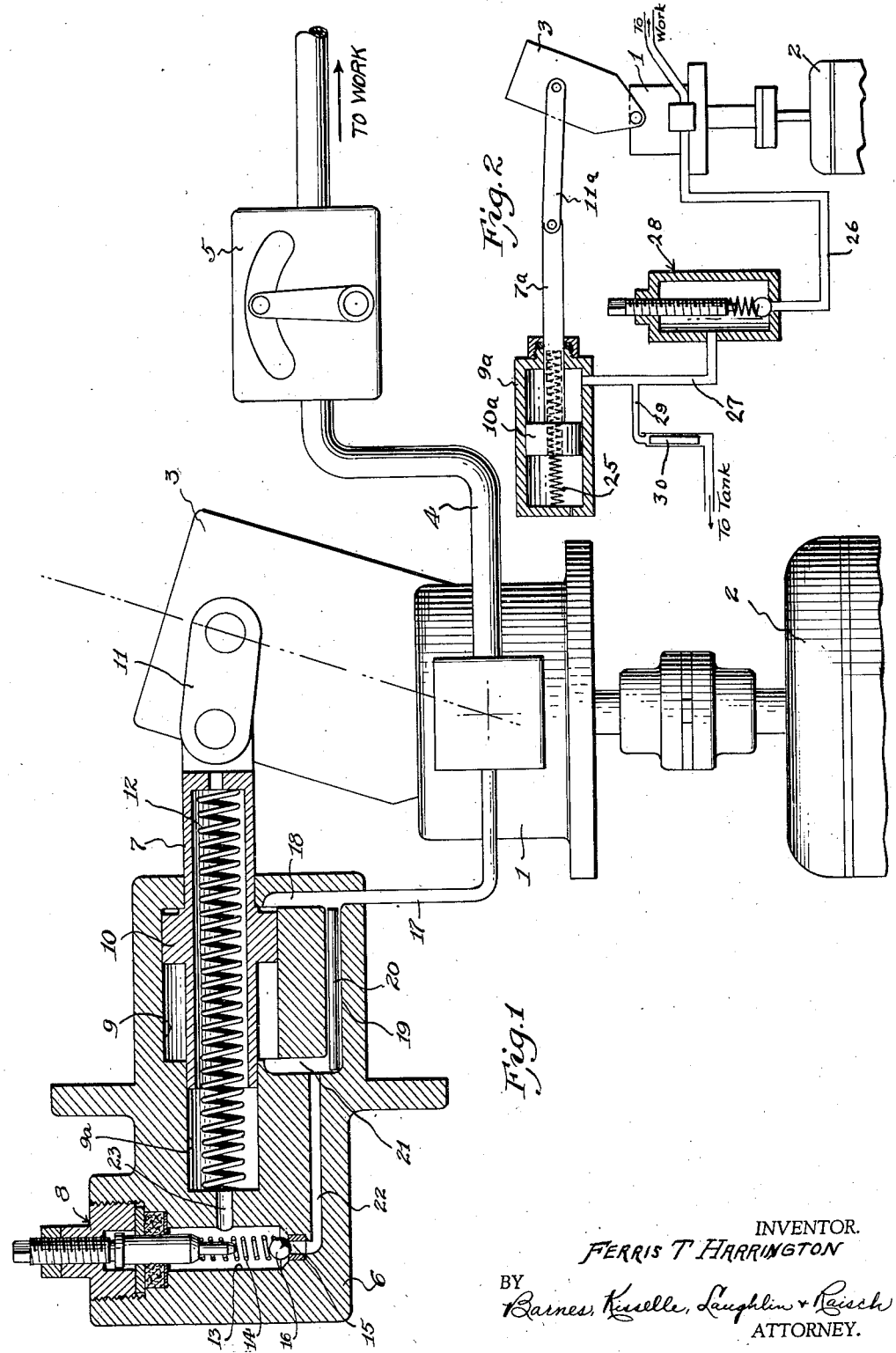
INVENTOR.
FERRIS T. HARRINGTON
BY Barnes, Kisselle, Laughlin & Raisch
ATTORNEY.

Patented July 8, 1941

2,248,076

UNITED STATES PATENT OFFICE 2,248,076

CONSTANT PRESSURE REGULATOR

Ferris T. Harrington, Detroit, Mich., assignor to Vickers, Incorporated, Detroit, Mich., a corporation of Michigan Application November 5, 1937, Serial No. 173,004

5 Claims. (Cl. 103—38)

This invention relates to a constant pressure regulator and has particularly to do with a device to be used with a variable displacement pump to maintain a substantially constant pump pressure within the volumetric range of the pump.

In previous pressure compensating control devices it has been customary to back the control piston with a very stiff spring and it has not been possible to obtain a smooth non-chattering action on the control. The present invention contemplates backing the control piston with a pressure regulator chamber as well as a spring whereby a smooth and accurate control may be obtained.

It is an object of this invention to provide a volumetric control for a variable volume pump whereby the pump output may be varied from maximum to zero while the pump pressure is varying from zero to a maximum. The invention is used especially in large sheet metal stamping machines or presses in which a constant or decreasing pump volume is required as the press closes, and when the press reaches the lower end of its stroke a maximum pump pressure is maintained with substantially no pump volume. In this way the press may be used to iron out the wrinkles in a stamping. In general the control is adapted for use where it is desirable on some jobs to cut off rapidly from full volume, full pressure, to practically no volume, peak pressure, accompanied by decrease in horsepower input.

In the drawing:

Fig. 1 illustrates a diagrammatic sketch of a variable piston displacement pump and its connection with the constant pressure regulator, the latter being shown in detail cross-section.

Fig. 2 illustrates a modification of the invention.

The pump 1 is driven through a coupling by the motor 2 and has a movable swivel head 3. The volume output of the pump is directly proportional to the piston displacement of the pump. This piston displacement of the pump can be increased or decreased by moving the swivel head 3 with respect to the main body 1 of the pump, and the greater the angle between the central axis of the main body of the pump and the swivel head, the greater is the volumetric output of the pump. Fluid under pressure is pumped through the outlet conduit 4 and a combined flow control and relief valve 5 is provided as an auxiliary control device for the pressure fluid passing to the work.

The constant pressure regulator consists, in the main, of a housing 6, a piston 7 and a relief or pilot valve 8. The housing 6 is provided with cylindrical recesses 9 and 9a, in which is slidably mounted the piston 7. The piston 7 consists of a hollow cylinder open at both ends and is provided with a spool portion 10 dimensioned to fit the larger recess 9. The diameters of the piston 7 on each side of the spool 10 are equal. One end of the piston 7 projects out of the housing 6 and is pivotally connected to the swivel head 3 by a link 11. The piston is urged to the right as viewed in the drawing by a relatively light spring 12 which is of sufficient strength to move the swivel head 3 to its full stroke or volume position under normal conditions. The housing 6 also has another cylindrical recess 13 in which is located the adjustable relief or pilot valve 8, which consists of a spring 14, valve seat 15 and a valve 16.

The various recesses of the valve housing 6 are connected by the passageways in the following manner: The pressure outlet of the pump 1 is open to the chamber to the right of the spool 10 through a conduit 17 and the passageway 18. The conduit 17 also leads to the chamber to the left of the spool 10 through a passageway 19 which contains a restriction 20, and through a passageway 21. The left side of the spool 10 is also open to the relief valve 15 through passageway 21 and passageway 22, and the relief valve recess 13 opens to the recess 9a through a port 23. The recess 9a is connected to the tank through the central recess in the piston 7.

In the operation, the relief valve 8 is set for a certain desired pressure. After the pump 1 is started, the pressure in the system will be transmitted equally to both sides of the spool 10 in spite of the restriction 20 in the passageway 19. When the pressure in the system exceeds the setting of the pilot valve 8, the valve 16 will open the port 15, and the pressure to the left of the spool 10 will exhaust at a faster rate than it can be supplied through the restricted passageway 19. As a result the piston 7 is no longer balanced and the pressure on the right side of the spool 10 will be sufficient to overcome the spring 12 and actuate the piston 7. This will decrease the angle between the swivel head 3 and the pump body 1 and will also reduce the volume output of the pump. As a consequence, the pressure in the system will drop to the point where it equals the pilot valve setting. The effect of this cooperation between the piston 7 and the relief valve 8 is that an equilibrium is established between the spring 12 and the pressure in the pump so that a constant pump pressure is maintained in the hydraulic system after a pressure is reached which is equal to the setting of the check valve.

The embodiment shown in Fig. 2 is adapted to perform much the same functions as those of the above described embodiment in a slightly different manner. In this embodiment the motor 2 drives the variable delivery pump 1 having a movable swivel head 3. A cylinder 9a has within its walls a piston 10a with a rod 7a extending through the end of the cylinder and connected to the swivel head 3 by a link 11a. A spring 25 urges the piston 10a toward the right end of the cylinder 9a and has sufficient strength to move the swivel head 3 to its full volume position. Between conduits 26 and 27 which connect the pump outlet to the right end of the cylinder 9a, is located an adjustable check valve 28 adapted to admit liquid from the conduit 26 to the conduit 27 when the pump pressure reaches a certain predetermined point. The conduit 27 is connected to the tank by a conduit 29 in which is located a restriction 30 similar to the restriction 30 in Fig. 1.

In the operation of this modification shown in Fig. 2, after the pressure at the work end in the pump 1 develops to a certain point, check valve 28 will admit liquid under pressure to the piston 10a and tend to reduce the volume output of the pump by moving the swivel head 3 to the left. The size of the restriction 30 in this embodiment will regulate the speed at which the piston 10a may be moved and it will be noticed that when the pressure in the pump again reduces to below the setting of the relief valve 28, the restriction 30 will regulate the speed at which the piston 10a returns to its normal position thereby controlling the increase in the volume output of the pump.

The springs which are intended to be used with this invention are designed to have a predetermined spring range. For example, if 500 pounds per square inch pressure is required at a maximum volume condition and 750 pounds per square inch pressure is required at a minimum volume condition, the spring range necessary will be two hundred fifty pounds per square inch.

I claim:

1. A pressure actuated volume control unit adapted to be used with a variable delivery pump comprising a housing, a slidable piston in said housing having one side constantly exposed to pump pressure, a relatively light spring located in an axial recess in said piston and bearing at one end on said housing and at the other end on said piston, and a pressure regulator chamber formed in said housing on the other side of said piston, said chamber being open to said pump pressure through a restricted passageway, a spring pressed relief valve located between said chamber and a tank connection, and an operative connection between said piston and said pump comprising a rod-like axial extension on said piston extending through one wall of said housing whereby movement of said piston will control the delivery of said pump.

2. The combination of a variable piston displacement pump of the type having a movable part adapted to determine, by its position, the delivery of the pump, and a constant pressure compensator comprising a housing, a piston in said housing having a recessed projecting portion extending from each end of said piston, one of said portions extending through a wall of said housing and being connected to said movable part, a relatively light spring located in the recesses of said portions and tending to move said movable part to full volume position, said housing having passageways connecting the pump pressure to both sides of said piston, the passageway to one side of said piston being substantially restricted, and a pilot valve adapted to relieve the last-named side of said piston as the pressure in said pump reaches a predetermined point.

3. A constant pressure regulator to regulate the volumetric output of a variable delivery pump of the type having a movable part adapted to determine, by its position, the delivery of the pump, comprising a housing, a piston slidable in said housing and operatively connected to the movable part of said pump by an axial extension through a wall of said housing, a relatively light spring means located in a recess of said piston and extension thereof and constantly urging said movable member to full volume position, said piston being normally in hydraulic balance by reason of its being exposed on each side to the pressure in said pump, and means for reducing the pressure on one side of said piston when a predetermined pressure is built up in the system whereby the delivery of said pump is reduced and the pressure in said system maintained at said predetermined pressure.

4. The combination of a variable piston displacement pump of the type having a movable part adapted to determine, by its position, the delivery of the pump, and a pressure compensator control unit comprising a housing, a piston in said housing adapted to control the position of said movable part when hydraulically actuated, a relatively light spring constantly tending to move said movable part to full volume position, said housing having passageways connecting the pressure in said pump to both sides of said piston, the passageway to one side of said piston being substantially restricted, and a pilot valve open to that side of the piston which is connected to the pump by the restricted passageway, said pilot valve being set to open at a predetermined pressure to reduce the pressure on one side of the piston and cause it to be hydraulically actuated, thereby reducing the volume output of the pump and maintaining the pressure on said pump substantially at the setting of said pilot valve.

5. In a pressure actuated volume control system, a variable delivery pump, a movable member on said pump for controlling the volume output thereof, a control unit comprising a cylinder housing, a slidable piston located in said cylinder having recessed axial extensions from each end thereof, one of said extensions being operatively connected to said movable member, spring means tending constantly to move said movable member to full volume position, pressure connections between said pump and said cylinder, and a spring pressed check valve and restricted passageway in said pressure connections located between said pump and a tank connection.

FERRIS T. HARRINGTON.